P. ANDERS AND P. M. GINNINGS.
DISTILLING APPARATUS.
APPLICATION FILED FEB. 25, 1921.
1,418,691.
Patented June 6, 1922.
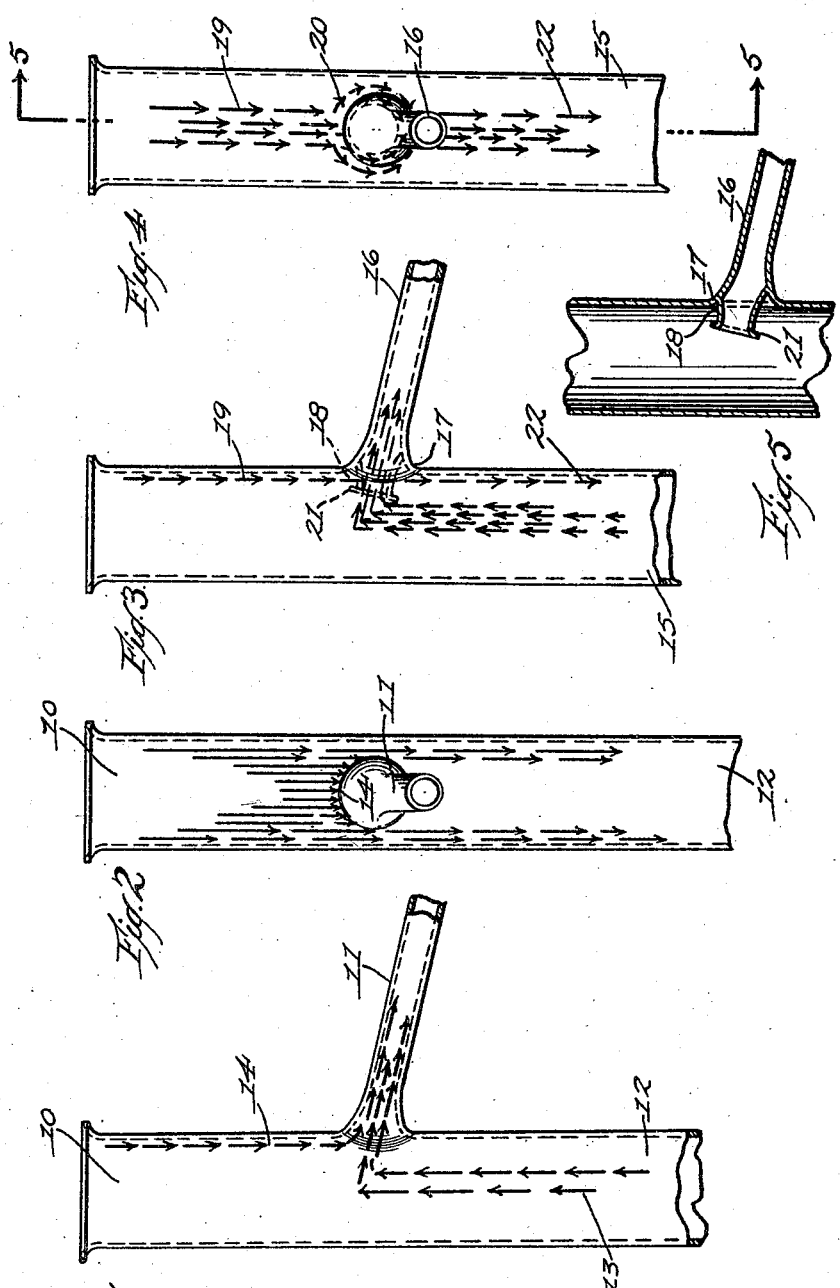
Inventors
Paul Anders
Paul Meade Ginnings
By their Attorney
George C. Heinicke

UNITED STATES PATENT OFFICE.

PAUL ANDERS AND PAUL MEADE GINNINGS, OF URBANA, ILLINOIS.

DISTILLING APPARATUS.

1,418,691.     Specification of Letters Patent.      Patented June 6, 1922.

Application filed February 25, 1921. Serial No. 447,726.

*To all whom it may concern:*

Be it known that I, PAUL ANDERS, a citizen of Germany, residing at Urbana, county of Champaign, and State of Illinois, and I, PAUL MEADE GINNINGS, a citizen of the United States, residing at Urbana, county of Champaign, and State of Illinois, have invented certain new and useful Improvements in Distilling Apparatus, of which the following is a specification.

This invention relates to improvements in distilling apparatus used in laboratories, factories or the like and particularly to improvements in so called distilling heads.

It is the primary object of this invention to produce a distilling head in which the vapors of the material under treatment are positively prevented from becoming contaminated or impure before they enter the condenser or receiving apparatus.

It is a well known fact that the vapors of the condensing liquid or compound rising into the distilling head of the apparatus used at present condense on the sides and top of the head and come in contact with the stopper closing the top of the head which is frequently impure and covered by foreign matter or substances.

The liquid which condenses on the rubber, cork or glass stopper and the inner walls of the distilling head is therefore frequently impure and after flowing down the sides and inner walls of the distilling head mixes with the pure distillate at the outlet to the condenser or receiving apparatus and contaminates the distillate. This is a great disadvantage if a distillate of great purity is to be won and is especially aggravating, if for instance rubber stoppers are used to close the head. In such a case the stopper decomposes readily, and the colored liquid of condensation mixes with the pure distillate and contaminates the same moreover effecting a change in its color.

It is the principal object of our invention to positively prevent such contamination of the distillate, and to effectively protect the same against any mixture with the impure products of the condensation in the head.

A further object of the invention is to provide an apparatus of simple construction which may be cheaply made of glass, metal or any other suitable material.

With these and other objects in view the side or branch tube leading from the distilling head to the condenser and receiving apparatus is extended for a short distance into the head so that any liquid of condensation flowing down the side walls of the head will be positively prevented from mixing with the pure distillate or from flowing into said side or branch tube.

Other objects and advantages of the invention will become known as the description thereof proceeds, reference being had to the accompanying drawing, in which—

Figure 1 is a side elevation of a distilling head of known construction.

Figure 2 is a front view thereof.

Figure 3 is a side view of a distilling head constructed according to our invention.

Figure 4 is a front view thereof, and

Figure 5 is a section on line 5—5 of Figure 4.

In the known apparatus illustrated in Figures 1 and 2, the distilling head 10 of metal, glass or any other suitable material is provided with a branch or side tube 11. In this head the vapor rising from the bottom 12 of the head in the direction of the arrows 13 follows approximately the path indicated by these arrows into the tube 11 and through the same into the condenser or receiving apparatus (not shown). The upper end of the head 10 may be closed by a cork, or glass stopper, equipped with a thermometer or with a separating funnel etc.

It will be clear that the vapors rising within the head will at least partly condense in the upper part of the same and the product of condensation will then flow down the inner wall of the head in the direction of the arrows 14 and into the branch tube 11 thus contaminating the distillate and carrying impurities along will prevent the production of a pure distillate the obtaining of which is highly desirable in many instances.

In order to avoid all these disadvantages we have improved the known distilling heads as illustrated in Figures 3, 4 and 5 of the drawing, in which 15 indicates the distilling head provided with the laterally disposed branch tube 16. The inner end of this tube is connected to the distilling head by pulling the wall of the head slightly out as indicated at 17, while the extreme inner end of the tube 16 is extended as at 18 a short distance into the interior of the distilling head.

It will be clear that any liquid of condensation flowing down in the upper part of the head in the direction of the arrows 19 will not flow, as in the known devices, into the branch tube 16, but will flow around the extension 18 of this tube as indicated by the arrows 20. The extreme outer end of the extension 18 is provided with a circular lip 21 and the space formed by this lip and the wall 17 will form a somewhat circular trough around the end of the tube 16. It will thus be evident that any liquid of condensation flowing down the inner walls of the distilling head must flow around the extreme inner end of the branch tube 16 instead of flowing into said tube and continue to flow downward as indicated by the arrows 22, back to the source of the vapor from which the distillate is being made.

In this manner the condensation in the condenser and the distillate collected in the receiving apparatus will be of extreme purity, a result which cannot be obtained with the distillery heads in use at the present time for the above given reasons.

While the preferred embodiment of our invention has been specifically illustrated and described, it is to be understood that the invention is not limited to its illustrated embodiment, but may be embodied in other constructions of distillation tubes, and we desire not to limit ourselves to the material from which our improved distillery head is made as metal or glass or any other suitable material may be used without deviating from the scope and spirit of our invention.

Having thus described our invention what we claim as new and desire to secure by Letters Patent of the United States is—

1. A distilling head of the character described, comprising a main column, a stopper closing the upper end of said column, a branch tube having its end made integral with the wall of said main column, an extension on the inner end of said branch tube extending onto said main column to approximately the center thereof, and a circular lip upon the extreme outer end of the extension, substantially as described and for the purpose set forth.

2. A distilling head of the character described, comprising a main column, a stopper closing the upper end of said column, a branch tube made integral with the material of said main column by drawing the material of the same out, an extension on said branch tube extending the same to approximately the center of said main column, a lip on the extreme end of said extension, said lip extension and outer wall of the branch tube at its point of union with the main column forming a trough for collecting the products of condensation flowing from the stopper down the inner walls of the main column and preventing their entrance into the branch tube.

3. In a device of the character described, the combination of a main column and a branch tube made integrally therewith, with an extension of the inner end of said branch tube into said main column, a lip at the extreme outer end of said branch tube for forming around the point of union between main column and the branch tube a trough for the collection of the liquid of condensation flowing down from the closed upper end of the main column and for preventing the entrance thereof into the branch tube and the condenser attached thereto, substantially as described.

In testimony whereof we have affixed our signatures.

PAUL ANDERS.
PAUL MEADE GINNINGS.